(12) United States Patent
Chen et al.

(10) Patent No.: US 11,371,899 B2
(45) Date of Patent: Jun. 28, 2022

(54) MEASURING ELEMENT WITH AN EXTENDED PERMEATION RESISTANT LAYER

(71) Applicant: Rosemount Inc., Shakopee, MN (US)

(72) Inventors: Fang Chen, Beijing (CN); Baogang Li, Beijing (CN); Paul Fadell, Cypress, TX (US)

(73) Assignee: ROSEMOUNT INC., Shakopee, MN (US)

(*) Notice: Subject to any disclaimer, the term of this patent is extended or adjusted under 35 U.S.C. 154(b) by 195 days.

(21) Appl. No.: 16/616,736

(22) PCT Filed: May 17, 2019

(86) PCT No.: PCT/US2019/032824
§ 371 (c)(1),
(2) Date: Nov. 25, 2019

(87) PCT Pub. No.: WO2019/222598
PCT Pub. Date: Nov. 21, 2019

(65) Prior Publication Data
US 2020/0333204 A1 Oct. 22, 2020

(30) Foreign Application Priority Data

May 17, 2018 (CN) .......................... 201810475248.1
May 17, 2018 (CN) .......................... 201820741719.4

(51) Int. Cl.
*G01L 13/02* (2006.01)
*G01L 19/06* (2006.01)
*B23K 11/093* (2006.01)

(52) U.S. Cl.
CPC .......... *G01L 13/025* (2013.01); *B23K 11/093* (2013.01); *G01L 19/0627* (2013.01); *G01L 19/0672* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS

| 4,089,036 A | 5/1978 | Geronime |
| 4,184,376 A | 1/1980 | Thomas et al. |

(Continued)

FOREIGN PATENT DOCUMENTS

| CA | 3035111 A1 | 4/2018 |
| CN | 101413839 A | 4/2009 |

(Continued)

OTHER PUBLICATIONS

Office Action, including Search Report, from Russian Patent Application No. 2020141418, dated May 11, 2021.

(Continued)

*Primary Examiner* — Andre J Allen
(74) *Attorney, Agent, or Firm* — Westman, Champlin & Koehler, P.A.

(57) ABSTRACT

The present disclosure is provided with a measuring element (M) and a measuring device. The measuring element includes a base body, a diaphragm and a permeation resistant layer, the diaphragm is fixedly connected to the base body, with a sealed cavity being defined between the diaphragm and the base body. The permeation resistant layer is arranged on an inner side surface, facing the sealed cavity, of the diaphragm, and extended continuously on the inner side surface of the diaphragm at least beyond a connection region of the diaphragm with the base body. The measuring device includes the measuring element (M).

20 Claims, 3 Drawing Sheets

(58) Field of Classification Search
CPC ... G01L 13/025; G01L 19/14; G01L 19/0038;
G01L 19/0084; G01L 9/0055; G01L
9/0075; G01L 19/0069; G01L 9/0052;
G01L 9/0073; G01L 19/0092; G01L
19/0618; G01L 19/0645; G01L 19/143;
G01L 9/0051; G01L 19/0007; G01L
19/0046; G01L 19/06; G01L 19/0627;
G01L 19/0681; G01L 27/002; G01L 9/00;
G01L 9/0041; G01L 9/0044; G01L
11/025; G01L 11/04; G01L 19/0023;
G01L 19/0672; G01L 19/069; G01L
19/142; G01L 19/145; G01L 19/16; G01L
7/00; G01L 9/0047; G01L 9/06; G01L
9/065; G01L 9/12; G01L 11/02; G01L
13/00; G01L 15/00; G01L 19/0015; G01L
19/003; G01L 19/02; G01L 19/0609;
G01L 19/083; G01L 19/10; G01L 19/148;
G01L 27/005; G01L 7/08; G01L 7/082;
G01L 7/163; G01L 7/166; G01L 9/0045;
G01L 9/0048; G01L 9/006; G01L 9/007;
G01L 9/0076; G01L 9/04; G01L 9/045;
G01L 9/125; G01L 11/00; G01L 17/00;
G01L 19/00; G01L 19/0076; G01L 19/08;
G01L 19/141; G01L 19/146; G01L 1/142;
G01L 1/2262; G01L 1/246; G01L 21/12;
G01L 23/16; G01L 27/007; G01L 7/04;
G01L 7/063; G01L 7/084; G01L 7/086;
G01L 7/16; G01L 9/0002; G01L 9/0007;
G01L 9/0016; G01L 9/0019; G01L
9/0022; G01L 9/0027; G01L 9/0033;
G01L 9/0039; G01L 9/005; G01L 9/0058;
G01L 9/0077; G01L 9/0079; G01L 9/008;
G01L 9/0092; G01L 9/0095; G01L 9/025;
G01L 9/08; G01L 9/085; G01L 9/105;
G01L 9/14; G01L 9/16; H01L
2224/48091; H01L 2924/00014; H01L
2224/48137; H01L 2224/48145; H01L
2224/73265; H01L 2924/00012; H01L
2224/04105; H01L 2224/24137; H01L
2224/49175; H01L 24/19; H01L
2924/1461; H01L 2924/1815; H01L
2924/18162; H01L 29/84; H01L 41/047;
H01L 41/0475; H01L 41/1132
USPC .................................................. 73/700–756
See application file for complete search history.

(56) References Cited

U.S. PATENT DOCUMENTS

| | | | |
|---|---|---|---|
| 4,370,890 A | 2/1983 | Frick | |
| 4,389,895 A | 6/1983 | Rud, Jr. | |
| 4,565,096 A | 1/1986 | Knecht | |
| 4,572,000 A | 2/1986 | Kooiman | |
| 4,611,492 A | 9/1986 | Koosmann | |
| 4,612,812 A | 9/1986 | Broden | |
| 4,638,830 A | 1/1987 | Brown et al. | |
| 4,653,523 A | 3/1987 | Brown | |
| 4,730,496 A | 3/1988 | Knecht et al. | |
| 4,773,269 A | 9/1988 | Knecht et al. | |
| 4,777,826 A | 10/1988 | Rud, Jr. et al. | |
| 4,790,192 A | 12/1988 | Knecht et al. | |
| 4,798,089 A | 1/1989 | Frick et al. | |
| 4,800,758 A | 1/1989 | Knecht et al. | |
| 4,833,920 A | 5/1989 | Knecht et al. | |
| 4,833,922 A | 5/1989 | Frick et al. | |
| 4,869,282 A | 9/1989 | Sittler et al. | |
| 4,905,575 A | 3/1990 | Knecht et al. | |
| 4,926,695 A | 5/1990 | Kleven et al. | |
| 4,950,499 A * | 8/1990 | Martin | C23C 14/205 204/192.14 |
| 4,970,898 A | 11/1990 | Walish et al. | |
| 5,095,755 A | 3/1992 | Peterson | |
| 5,157,972 A | 10/1992 | Broden et al. | |
| 5,184,514 A | 2/1993 | Cucci et al. | |
| 5,230,248 A | 7/1993 | Cucci et al. | |
| 5,287,746 A | 2/1994 | Broden | |
| 5,333,504 A | 8/1994 | Lutz et al. | |
| 5,343,762 A | 9/1994 | Beulke | |
| 5,396,810 A | 3/1995 | Beulke | |
| 5,483,834 A | 1/1996 | Frick | |
| 5,495,768 A | 3/1996 | Louwagie et al. | |
| 5,515,732 A | 5/1996 | Willcox et al. | |
| 5,524,492 A | 6/1996 | Frick et al. | |
| 5,578,760 A * | 11/1996 | Suzuki | G01L 19/0645 73/706 |
| 5,695,590 A | 12/1997 | Willcox et al. | |
| 5,731,522 A | 3/1998 | Sittler | |
| 5,760,310 A | 6/1998 | Rud, Jr. et al. | |
| 5,922,965 A | 7/1999 | Behm et al. | |
| 6,003,219 A | 12/1999 | Frick et al. | |
| 6,030,709 A * | 2/2000 | Jensen | C23C 30/00 338/25 |
| 6,038,961 A | 3/2000 | Filippi et al. | |
| 6,055,863 A | 5/2000 | Behm et al. | |
| 6,120,033 A | 9/2000 | Filippi et al. | |
| 6,295,875 B1 | 10/2001 | Frick et al. | |
| 6,425,290 B2 | 7/2002 | Willcox et al. | |
| 6,484,585 B1 | 11/2002 | Sittler et al. | |
| 6,505,516 B1 | 1/2003 | Frick et al. | |
| 6,516,672 B2 | 2/2003 | Wang | |
| 6,568,278 B2 | 5/2003 | Nelson et al. | |
| 6,612,174 B2 | 9/2003 | Sittler et al. | |
| 6,647,794 B1 | 11/2003 | Nelson et al. | |
| 6,662,662 B1 | 12/2003 | Nord et al. | |
| 6,675,655 B2 | 1/2004 | Broden et al. | |
| 6,782,754 B1 | 8/2004 | Broden et al. | |
| 6,843,133 B2 | 1/2005 | Broden et al. | |
| 7,036,381 B2 | 5/2006 | Broden et al. | |
| 7,096,738 B2 | 8/2006 | Schumacher | |
| 7,115,118 B2 | 10/2006 | Broden | |
| 7,117,745 B2 | 10/2006 | Broden | |
| 7,124,641 B2 | 10/2006 | Broden et al. | |
| 7,255,012 B2 | 8/2007 | Hedtke | |
| 7,258,021 B2 | 8/2007 | Broden | |
| 7,295,131 B2 | 11/2007 | Anderson et al. | |
| 7,308,830 B2 | 12/2007 | Harasyn et al. | |
| 7,334,484 B2 | 2/2008 | Harasyn et al. | |
| 7,373,831 B2 | 5/2008 | Broden | |
| 7,377,174 B2 | 5/2008 | Sundet | |
| 7,415,886 B2 | 8/2008 | Schumacher et al. | |
| 7,437,938 B2 | 11/2008 | Chakraborty | |
| 7,448,275 B1 | 11/2008 | Sundet et al. | |
| 7,454,975 B2 | 11/2008 | Louwagie et al. | |
| 7,484,416 B1 | 2/2009 | Klosinski et al. | |
| 7,503,220 B2 | 3/2009 | Sittler et al. | |
| 7,591,184 B2 | 9/2009 | Broden | |
| 7,624,642 B2 | 12/2009 | Romo | |
| 7,779,698 B2 | 8/2010 | Willcox | |
| 7,814,798 B2 | 10/2010 | Filippi et al. | |
| 7,819,014 B1 | 10/2010 | Broden | |
| 7,882,736 B2 | 2/2011 | Schumacher | |
| 8,042,401 B2 | 10/2011 | Broden | |
| 8,079,269 B2 | 12/2011 | Chakraborty | |
| 8,234,927 B2 | 8/2012 | Schulte et al. | |
| 8,429,978 B2 | 4/2013 | Klosinski et al. | |
| 8,448,519 B2 | 5/2013 | Broden et al. | |
| 8,596,141 B2 | 12/2013 | Konyukhov et al. | |
| 8,720,277 B2 | 5/2014 | Norberg et al. | |
| 8,776,608 B2 | 7/2014 | Hedtke et al. | |
| 8,813,572 B2 | 8/2014 | Hedtke | |
| 8,915,140 B2 | 12/2014 | Romo et al. | |
| 9,010,191 B2 | 4/2015 | Strei et al. | |
| 9,038,476 B2 | 5/2015 | Strei et al. | |
| 9,057,659 B2 | 6/2015 | Hedtke | |
| 9,234,776 B2 | 1/2016 | Strei | |
| 9,274,018 B2 | 3/2016 | Miller et al. | |

(56) References Cited

U.S. PATENT DOCUMENTS

| | | |
|---|---|---|
| 9,316,553 B2 | 4/2016 | Willcox |
| 9,389,106 B2 | 7/2016 | Breen et al. |
| 9,459,170 B2 | 10/2016 | Haywood |
| 9,476,789 B2 | 10/2016 | Champredonde et al. |
| 9,513,183 B2 | 12/2016 | Thompson et al. |
| 9,562,819 B2 | 2/2017 | Fadell et al. |
| 9,689,769 B2 | 6/2017 | Eriksen et al. |
| 9,719,872 B2 | 8/2017 | Willcox et al. |
| 9,752,945 B2 | 9/2017 | Hedtke et al. |
| 9,772,246 B2 | 9/2017 | Hoffman et al. |
| 9,857,259 B2 | 1/2018 | Broden et al. |
| 9,909,909 B2 | 3/2018 | Schumacher |
| 10,048,152 B2 | 8/2018 | Fetisov et al. |
| 10,060,813 B2 | 8/2018 | Willcox et al. |
| 10,060,814 B2 | 8/2018 | Schumacher |
| 10,067,023 B2 | 9/2018 | Hugel et al. |
| 10,156,491 B2 | 12/2018 | Fetisov |
| 10,203,258 B2 | 2/2019 | Romo et al. |
| 10,378,984 B2 | 8/2019 | Li |
| 10,514,311 B2 | 12/2019 | Xiaoang et al. |
| 10,584,309 B2 | 3/2020 | Fadell et al. |
| 10,598,559 B2 | 3/2020 | Andrew et al. |
| 10,627,302 B2 | 4/2020 | Strei et al. |
| 10,816,424 B2 | 10/2020 | Fadell et al. |
| 2010/0064816 A1 | 3/2010 | Fillippi et al. |
| 2012/0239313 A1 | 9/2012 | Champredonde et al. |
| 2013/0320662 A1 | 12/2013 | Norberg et al. |
| 2015/0228365 A1 | 8/2015 | Arita et al. |
| 2015/0377730 A1 | 12/2015 | Xiaoang et al. |
| 2016/0091383 A1 | 3/2016 | Hoffman et al. |
| 2017/0003188 A1 | 1/2017 | Champredonde et al. |
| 2017/0010169 A1 | 1/2017 | Hugel et al. |
| 2017/0113917 A1* | 4/2017 | Yoshikawa ............ G01L 9/0048 |
| 2017/0356820 A1 | 12/2017 | Hoffman et al. |
| 2018/0245998 A1 | 8/2018 | Li |
| 2019/0259779 A1* | 8/2019 | Izumitani ............ H01L 27/1203 |
| 2020/0284681 A1 | 9/2020 | Hoffman et al. |

FOREIGN PATENT DOCUMENTS

| | | |
|---|---|---|
| CN | 102159928 A | 8/2011 |
| CN | 102575966 A | 7/2012 |
| CN | 103196623 A | 7/2013 |
| CN | 103454031 A | 12/2013 |
| CN | 204556155 U | 8/2015 |
| CN | 105203252 A | 12/2015 |
| CN | 106053948 A | 10/2016 |
| CN | 106062526 A | 10/2016 |
| CN | 106289634 A | 1/2017 |
| DE | 10 2010 018 377 | 4/2011 |
| EP | 0965829 B1 | 8/2004 |
| JP | 3-44646 | 4/1991 |
| JP | H11351991 A | 12/1999 |
| JP | 2001208629 A | 8/2001 |
| JP | 2013257225 A | 12/2013 |
| RU | 2585641 C2 | 5/2016 |
| SU | 991959 A3 | 1/1983 |
| WO | WO 2018/058487 | 4/2018 |

OTHER PUBLICATIONS

Communication Pursuant to Rules 161(1) and 162 EPC from European Application No. 19728282.5, dated Nov. 3, 2020.

Notification of Transmittal of the International Search Report and the Written Opinion of the International Searching Authority from International Application No. PCT/US2019/032824, dated Aug. 30, 2019.

Office Action from Chinese Application No. 201980003676.7, dated Apr. 1, 2021.

Third Office Action, including Search Report, from Chinese Patent Application No. 201980003676.7, dated Dec. 31, 2021.

Office Action, including Search Report, from Chinese Patent Application No. 201980003676.7, dated Aug. 23, 2021.

Office Action, including Search Report, from Japanese Patent Application No. 2020-555817, dated Sep. 22, 2021.

Office Action from Canadian Application No. 3,099,745, dated Nov. 18, 2021.

Final Office Action from Japanese Application No. 2020-555817, dated Feb. 2, 2022.

* cited by examiner

MEASURING ELEMENT WITH AN EXTENDED PERMEATION RESISTANT LAYER

CROSS-REFERENCE TO RELATED APPLICATION

This Application is a Section 371 National Stage Application of International Application No. PCT/US2019/032824, filed May 17, 2019, published as WO 2019/222598 on Nov. 21, 2019, which claims priority to Chinese Patent Application No. 201810475248.1, filed May 17, 2018, and Chinese Patent Application No. 201820741719.4, filed May 17, 2018, the contents of which are hereby incorporated by reference in their entirety.

FIELD

The present disclosure relates to a measuring element and a measuring device comprising the same.

BACKGROUND

The content of this section merely provides the background information related to the present disclosure, which may not constitute the prior art.

In industrial processes such as coal chemical industry, paper industry, cement and the like, it is often necessary to obtain relevant measurement parameters (for example, pressure, differential pressure, liquid level) of a process medium (or a medium to be measured) for better performance in production or process control. Due to the limitations of the operating conditions of such production (such as high temperature, strong corrosiveness, high pressure), remote transmission measuring devices (for example, remote transmitters) are usually used to obtain the relevant parameters of the medium to be measured. Generally, there is a measuring element at the end of the medium to be measured in such a remote measuring device. The measuring element may include a base body and a diaphragm. A sealed cavity is defined between the diaphragm and the base body. The sealed cavity can be filled with working fluid. Thus, for example, pressure measurement or monitoring of the medium to be measured may be performed by changes in fluid pressure on both sides of the diaphragm.

However, since many of the medium to be measured is a hydrogen-rich medium, and the hydrogen in the medium to be measured may pass through the diaphragm and enter into the sealed cavity to aggregate and cause a pressure deviation, which leading to an inaccurate measurement accuracy of the measuring device, and in serious cases, the diaphragm may be inflated or even broken.

Therefore, it is particularly desirable to provide an improved measuring element and measuring device.

SUMMARY

It is an object of the present disclosure to provide an improved measuring element and a measuring device, to achieve at least one of the following objects: improving the measurement accuracy, improving the wear resistance ability, increasing the service life, simplifying the production processes and saving costs.

A measuring element is provided according to one aspect of the present disclosure, which includes: a base body; a diaphragm fixedly connected to the base body, with a sealed cavity being defined between the diaphragm and the base body; and a permeation resistant layer arranged on an inner side surface, facing the sealed cavity, of the diaphragm, and extended continuously on the inner side surface of the diaphragm at least beyond a connection region of the diaphragm with the base body.

According to an embodiment, the diaphragm is fixedly connected to the base body by resistance seam welding.

According to an embodiment, the diaphragm is connected to the base body by TIG welding (Tungsten Inert Gas Welding) and resistance seam welding, and a welding region for the resistance seam welding is radially located at an inner side of a welding region for the TIG welding.

According to an embodiment, the permeation resistant layer is extended over the entire inner side surface of the diaphragm.

According to an embodiment, a coating thickness of the permeation resistant layer on the diaphragm is less than or equal to 10 μm.

According to an embodiment, the diaphragm is formed with one or more annular folds.

According to an embodiment, the base body is provided with a recess at a portion corresponding to the diaphragm.

According to an embodiment, the base body is provided with a fluid channel for filling the sealed cavity with a fluid.

According to an embodiment, the permeation resistant layer is a gold-plated layer formed on the inner side surface of the diaphragm.

A measuring device is provided according to another aspect of the present disclosure, which includes the measuring element described above.

According to the present disclosure, substances (for example, hydrogen) in a medium to be measured is protected from permeating into the sealed cavity by arranging a permeation resistance layer (for example, the gold-plated layer) on the diaphragm, which greatly improving the measurement accuracy of the measuring element and the measuring device. Moreover, since the permeation resistance layer is designed to face the inner side of the sealed cavity, the permeation resistance layer does not directly come into contact with the medium to be measured, and cannot be scratched by particles in the medium to be measured, which improving the wear resistance ability of a product. Under the premise of ensuring welding strength and quality, a design with zero hydrogen permeation paths is realized, which improving the service life of the product. In addition, a safe transportation and a low inventory, as well as a large cost saving may be realized due to the fact that an one-side integral or partial permeation resistance layer can be directly arranged on the sealed diaphragm before the diaphragm is connected to the base body. Moreover, since the permeation resistance layer may cover only the diaphragm, material costs can be greatly reduced.

BRIEF DESCRIPTION OF THE DRAWINGS

The features and advantages of one or more embodiments of the present disclosure will be more easily to understand from the following description of the accompanying drawings, in which.

DETAILED DESCRIPTION OF EMBODIMENTS

Figure 1:
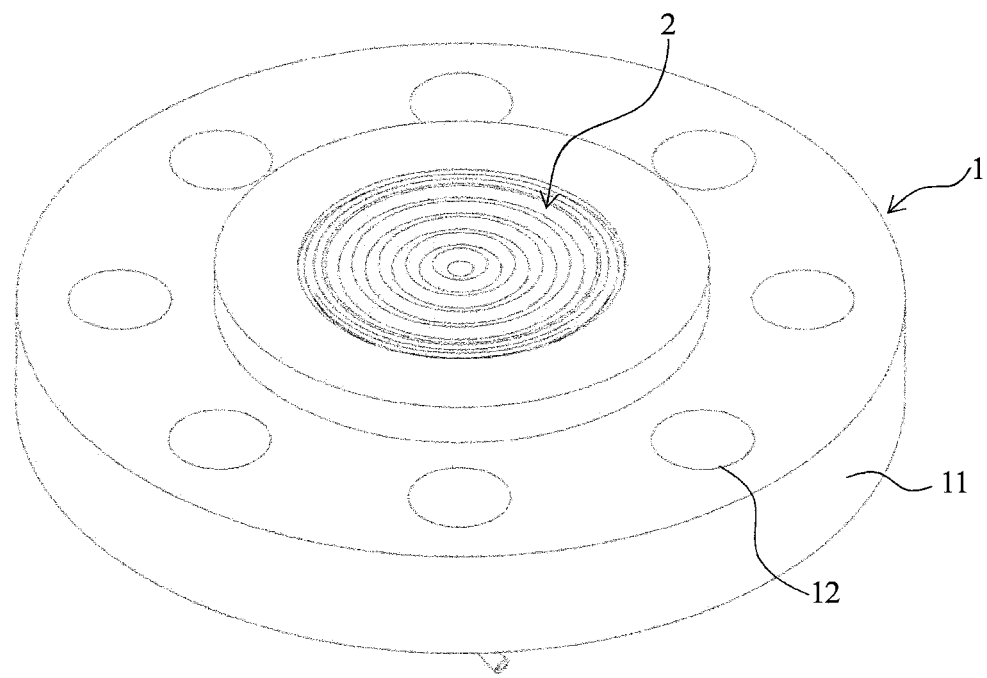
FIG. 1 is a perspective schematic view of a measuring element according to an embodiment of the present disclosure.

The following descriptions of the preferred embodiments are only exemplary, but not a limit of the present disclosure and application and usage thereof. Throughout several drawings, the same reference numerals indicate the same or corresponding parts, and thus the construction of the same parts will not be described repeatedly.

In the description of the present disclosure, for the convenience of description, a measuring element and a measuring device according to the present disclosure will be described by, for example, a remote measuring device for measuring a pressure or pressure difference of a medium to be measured. However, it should be understood that the present disclosure is not limited to the structures and applications described in the following preferred embodiments, and can be applied to any feasible structure or application, for example, measuring viscosity liquid level, etc. Also, the present disclosure is not limited to the remote measuring devices, and can be applied to any feasible devices or means.

Figure 6:
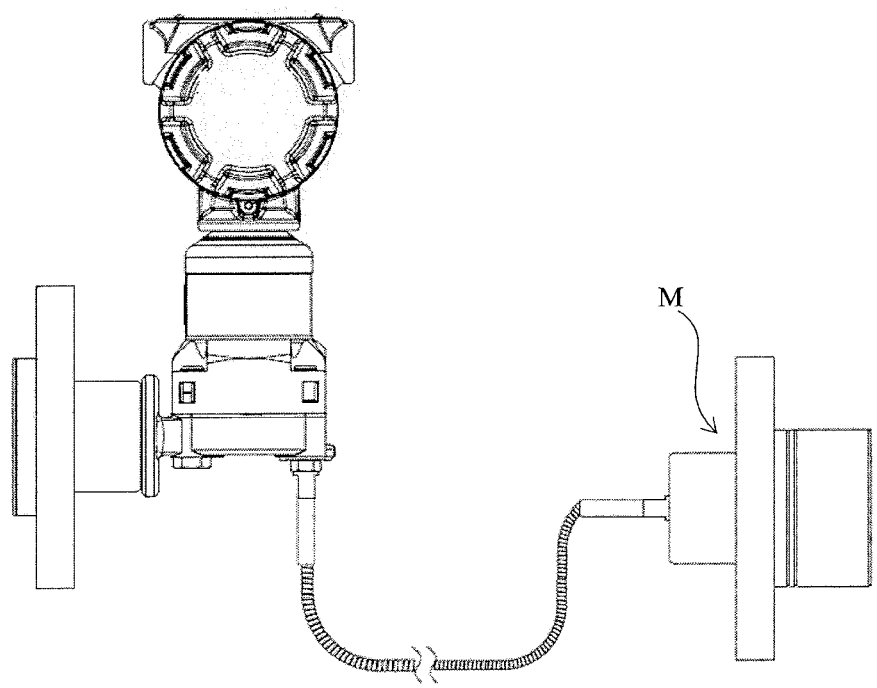
FIG. 6 is a schematic structural view of a measuring device according to an embodiment of the present disclosure.

As described above, the remote measuring device generally includes the measuring element at the medium to be measured. Such a measuring element may be provided with a sealed cavity defined by a diaphragm and a base body. The sealed cavity may be filled with a fluid (or referred to as a working fluid) for measurement. The remote measuring device may further include a sensing assembly located at a distance from the measuring element, during the measurement, the measuring element comes into contact with the medium to be measured and transmits the sensed pressure to the sensing assembly, which converting a physical quantity measured by the measuring element to an digital quantity actually required. During application, the side of the diaphragm facing away from the sealed cavity (referred to herein as an outer side) and the side facing the sealed cavity (similarly, referred to as an inner side) are subjected to the pressure from the medium to be measured and the pressure of the working fluid within the sealed cavity respectively. The diaphragm transmits the pressure from the measuring medium to the working fluid, which then transmits the sensed pressure to a sensing element for associated processing. In the schematic structural view of the measuring device according to an embodiment of the present disclosure shown FIG. 6, the measuring device according to the present disclosure may include a measuring element as described in detail below (as indicated by M in FIG. 6).

The measuring element according to the present disclosure will be further described in detailed in conjunction with FIGS. 1 to 6 below. For the sake of clarity, not all parts in the drawings are labeled.

FIG. 1 shows a perspective schematic view of the measuring element in accordance with an embodiment of the present disclosure. As shown in FIG. 1, the measuring element according to the present disclosure may include the base body 1 and the diaphragm 2 which are made of steel. In the embodiment, the diaphragm 2 may be a substantially circular sheet member. The diaphragm 2 may be fixedly connected to the base body 1 by the periphery of the diaphragm 2, so that a sealed cavity 3 (see FIG. 3) is defined between the diaphragm 2 and the base body 1. A working fluid may be accommodated in the sealed cavity 3. For example, the sealed cavity 3 may be filled with oil. Thus, during application, the outer side surface 22 of the diaphragm 2 may be displaced by the pressure of the measuring medium, and the displacement can be transmitted to the sensing element through the working fluid within the sealed cavity, which providing the pressure parameters required for a process control.

As shown in FIGS. 1 to 4, the diaphragm 2 may be provided with one or more annular folds 23, allowing the diaphragm 2 to be properly deformed or partially displaced. Alternatively, one or more depressions may be provided on the diaphragm 2 if the diaphragm 2 has sufficient thickness. Of course, the fold and the depressions on the diaphragm 2 are not limited to being annular.

The base body 1 may be provided with a recess 15 at a portion corresponding to the diaphragm 2 so as to form the sealed cavity 3 through the base body 1 and the diaphragm 2.

Figure 2:
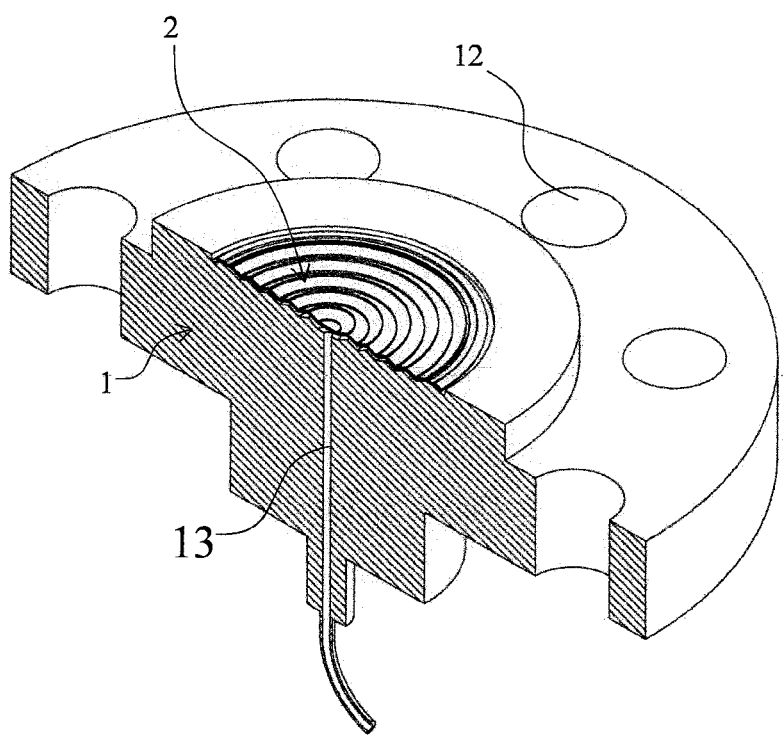
FIG. 2 is a sectional view of the measuring element of FIG. 1.
Figure 3:
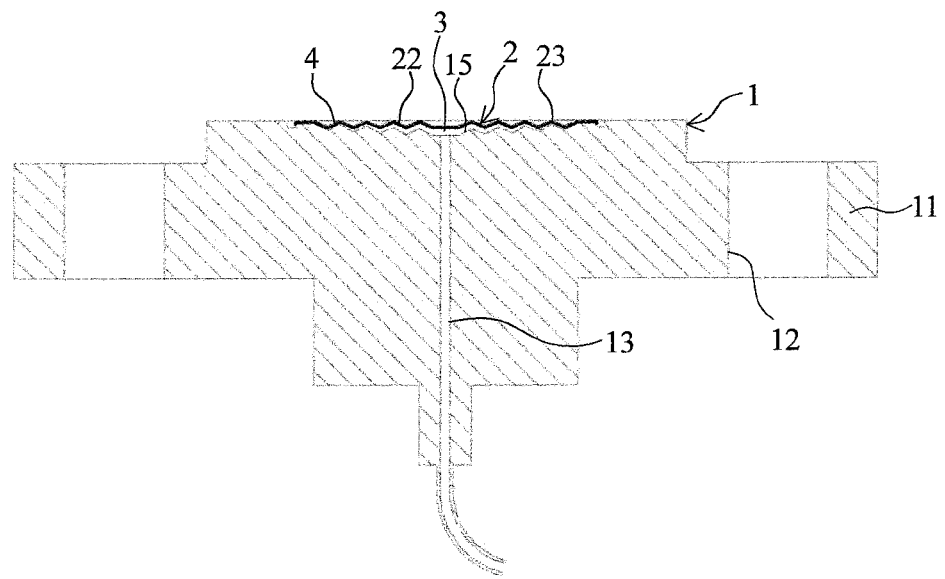
FIG. 3 is a schematic cross-sectional view of the measuring element of FIG. 1.
Figure 4:
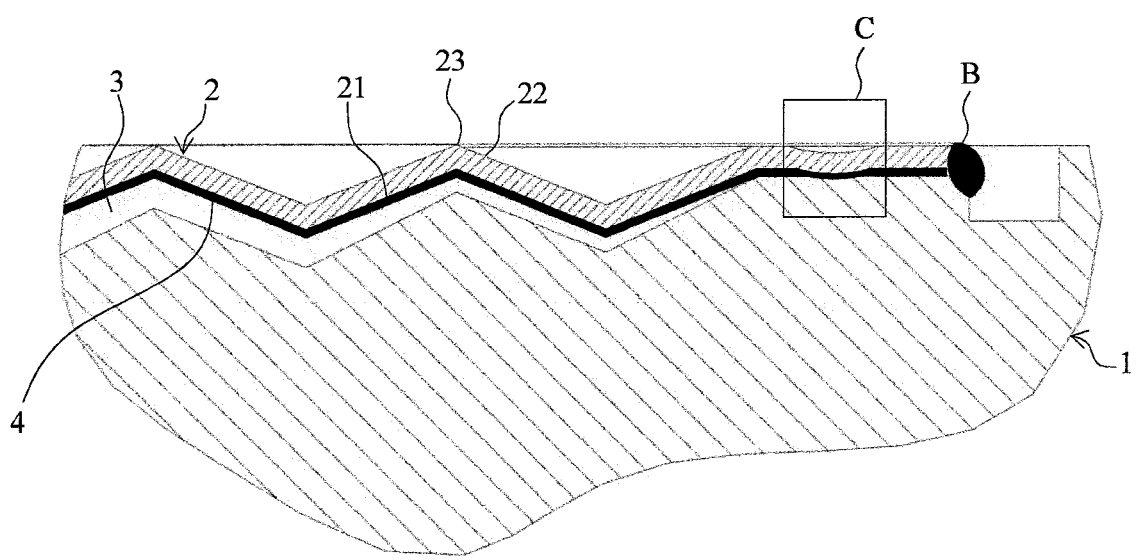
FIG. 4 is a partial sectional view of the measuring element according to an embodiment of the present disclosure.

The base body 1 can be further connected to the sensing assembly at a distal end. As shown in FIGS. 1 to 3, the base body 1 may have a flange portion 11, on which a through hole 12 through which a connecting member (such as a connecting bolt) passes may be provided. A fluid channel 13 may also be provided on the base body 1. The working fluid may be injected into the sealed cavity 3 through the fluid channel 13 before the measuring element is applied, and the fluid channel 13 is closed after the injection is completed. Thereby, when the medium to be measured is guided to the outer side surface of the diaphragm 2, the diaphragm 2 may be appropriately deformed or displaced based on the pressure of the measuring medium the diaphragm 2 feels, so that the parameters extraction or measurement can be performed.

However, the inventor has found that since the diaphragm 2 is usually thin, a part of the elements or components (for example, hydrogen) in the medium to be measured can easily permeate through the diaphragm 2 into the sealed cavity 3, and thus may be dissolved in the working fluid. Moreover, since the space of the sealed cavity 3 is relatively small and closed, the permeation of hydrogen may affect the pressure in the sealed cavity 3 and even cause the diaphragm 2 to bulge or rupture, which affecting the accuracy of the measurement and even causing damage to the measuring element.

To this end, the present disclosure provides a solution for arranging a permeation resistant structure. A permeation resistant layer may be arranged on the diaphragm 2, thus blocking a permeate path through the diaphragm. For a hydrogen-rich medium to be measured, a gold-plated layer may be provided to prevent hydrogen in the medium to be measured from permeating into the sealed cavity. Herein, for convenience of description, only the gold-plated layer is described as an example of the permeation resistant layer. For those skilled in the art, other permeation resistant materials other than gold may be used to achieve the object of preventing permeation depending on the actual application.

However, if the gold-plated layer is provided on the outer side surface 22 of the diaphragm 2, considering that there may be a large amount of solid particles (such as pulp, crushed stones, cinders and the like) contained in some of the mediums to be measured, which will scratch the gold-plated layer on the diaphragm 2. Since the diaphragm 2 is usually thin and the gold-plated layer is soft, the gold-plated layer is easily worn. As such, the gold-plated layer will lose its intended effect, resulting in a reduction in the wear resistance ability and service life of the measuring element (and even the measuring device) and a reduction in measurement accuracy. Furthermore, such a solution requires a gold layer to be applied around the entire outer side surface 22 of the diaphragm 2 as well as a seam area between the diaphragm 2 and the base body 1, which increases not only the cost but also the manufacturing process, and does not conducive to subsequent transportation and preservation.

In view of the above, the gold-plated layer 4 may be provided on the inner side surface 21 of the diaphragm 2 facing the sealed cavity 3. In this way, the gold-plated layer 4 is not in contact with the medium to be measured and thus is not affected by the solid particles in the medium to be measured.

The gold-plated layer 4 may extend continuously between the inner side surface 21 of the diaphragm 2 and the corresponding portion of the base body 1 (in other words, an outer diameter of the gold-plated layer should be at least equal to or larger than the outer diameter of the connection region of the diaphragm 2 and the base body 1) at least beyond the connection region of the diaphragm 2 with the base body 1, to prevent a hydrogen permeation path from being caused in the connection region between the diaphragm 2 and the base body 1. Optionally, the gold-plated layer 4 may cover the entire inner side surface 21 of the diaphragm 2 in its entirety.

The periphery of the diaphragm 2 may be fixedly connected to the base body 1 by means of resistance seam welding (or other means that does not cause damage to the gold-plated layer in the connection region between the diaphragm 2 and the base body 1).

Figure 5:
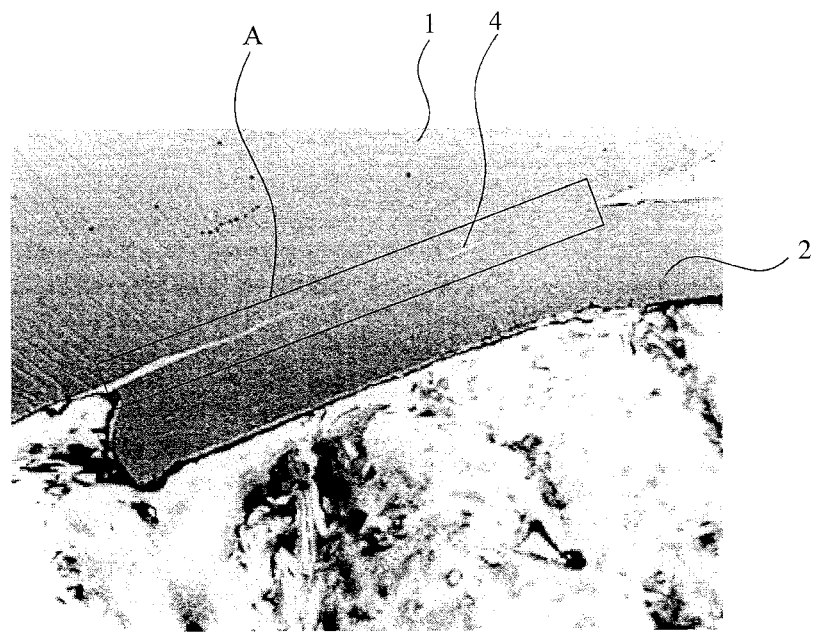
FIG. 5 is an EDX microscopic observation image of a partial section of the measuring element according to an embodiment of the present disclosure.

FIG. 5 shows an EDX microscopic view image of a partial section of the measuring element according to an embodiment of the present disclosure. As may be seen from FIG. 5, since there is an uninterrupted gold layer in the connection region A between the diaphragm 2 and the base body 1, the hydrogen permeation path of the sealed cavity may be completely blocked, which improving the accuracy of measurement.

It can be found that when performing a practical test by comparing an example that the gold-plated layer is arranged on the outer side of the diaphragm with an example that the gold-plated layer is arranged on the inner side of the diaphragm according to the present disclosure, the hydrogen resistance effect of the measuring element according to the present disclosure is almost the same as that of the gold-plated layer arranged on the outer side of the diaphragm.

Thus, according to the present disclosure, since the extended area of the permeation resistance layer covers at least the portion of the inner side surface 21 of the diaphragm 2 which is located in the sealed cavity 3 and in the connection region between the diaphragm 2 and the base body 1, the components and elements in the medium to be measured on the outer side of the diaphragm 2 cannot permeate into the sealed cavity 3 through the diaphragm 2. Therefore, the accuracy of the measurement may be improved. Furthermore, since the gold-plated layer is located on the inner side surface 21 of the diaphragm 2, which is not affected by the medium to be measured, which improving the wear resistance ability and the service life of the measuring element. In addition, since the sealed diaphragm 2 can be directly integrally gold-plated at one side or partially gold-plated before assembly, the safe transportation and the low inventory may be achieved, and a lot of transportation and maintenance costs can be saved. Moreover, since the permeation resistance layer can cover the diaphragm only, the material cost may be greatly reduced as compared with the previously mentioned solution that the gold-plated layer is gold-plated on the outer side of the diaphragm 2.

Optionally, the periphery of the diaphragm 2 may be fixed to the base body 1 by TIG welding (as indicated by B in FIG. 4) or other fixed connection ways, and then the diaphragm 2 is further connected to the base body 1 (as shown by the C region in FIG. 4) by resistance seam welding or other feasible connection ways. Thereby, a stable fixed connection between the diaphragm 2 and the base body 1 can be achieved, and a possible hydrogen permeation path may be blocked as well. In such a case, the welding region of the resistance seam welding is located radially inward of the welding region of the TIG welding. Moreover, the coverage of the gold-plated layer 4 on the inner side surface 21 of the diaphragm 2 may extend beyond the welding region of the resistance seam welding only.

The gold-plated layer 4 may be provided on the inner side surface 21 of the diaphragm 2 by a usual process such as an electroplating process or vacuum plating. The thickness of the gold-plated layer 4 is preferably such that the measurement accuracy is not affected, for example, the thickness of the gold-plated layer may be 10 μm or less, for example, the thickness of the gold-plated layer may be 5 μm. The measuring element and the measuring device according to the present disclosure also have the advantages in measuring accuracy and cost etc., in terms of a technical solution that a problem caused by applying a gold-plated layer on the outer side surface 22 of the diaphragm 2 is solved by the way of increasing the thickness of the coating.

The diaphragm 2 can be made of a material that is the same as or different from that of the base body 1. Optionally, the diaphragm 2 and the base body 1 may both be made of a stainless steel material.

It can be understood from the above analysis that the measuring element and the measuring device according to the present disclosure improve the accuracy of the measurement, increase the service life of the parts, and reduce manufacturing and maintenance costs.

Although the various embodiments of the present disclosure have been described herein in detail, it should be understood that the present disclosure is not limited to the description in details herein and the illustrated embodiments, and other variations and modifications may be made by those skilled in the art without departing from the spirit and scope of the present disclosure. All such variations and modifications are intended to fall within the scope of the present disclosure.

The invention claimed is:

1. A measuring element, characterized by comprising:
   a base body;
   a diaphragm fixedly connected to the base body, with a sealed cavity being defined between the diaphragm and the base body;
   a permeation resistant layer arranged on an inner side surface, facing the sealed cavity, of the diaphragm, and extended continuously on the inner side surface of the diaphragm at least beyond a connection region of the diaphragm with the base body;
   a first weld along an interior radius of the diaphragm which seals the diaphragm to the base body; and
   a second weld along an exterior radius of the diaphragm which seals the diaphragm to the base body.

2. The measuring element according to claim 1, characterized in that the diaphragm is fixedly connected to the base body by resistance seam welding.

3. The measuring element according to claim 1, characterized in that the diaphragm is connected to the base body by TIG welding and resistance seam welding, and a welding region for the resistance seam welding is radially located at an inner side of a welding region for the TIG welding.

4. The measuring element according to claim 1, characterized in that the permeation resistant layer is extended over the entire inner side surface of the diaphragm.

5. The measuring element according to claim 1, characterized in that a coating thickness of the permeation resistant layer on the diaphragm is less than or equal to 10 µm.

6. The measuring element according to claim 1, characterized in that diaphragm is formed with one or more annular folds.

7. The measuring element according to claim 1, characterized in that the base body is provided with a recess at a portion corresponding to the diaphragm.

8. The measuring element according to claim 1, characterized in that the base body is provided with a fluid channel for filling the sealed cavity with a fluid.

9. The measuring element according to claim 1, characterized in that the permeation resistant layer is a gold-plated layer formed on the inner side surface of the diaphragm.

10. The measuring element of claim 1, wherein the first weld extends over the permeation resistant layer.

11. The measuring element of claim 10, wherein the permeation resistant layer does not extend to the exterior radius and the second weld.

12. A method of making a measurement element, comprising:
   providing a base body having a cavity formed therein;
   providing a diaphragm;
   applying a permeation resistant layer to an inner surface of the diaphragm;
      sealing the diaphragm to the base body with a first seal extending around an exterior radius of the diaphragm to thereby seal the cavity whereby the permeation resistant layer faces the cavity; and
      sealing the diaphragm to the base body with a second seal extending around an interior radius of the diaphragm whereby the second seal extends over the permeation resistant layer.

13. The method of claim 12, wherein the second seal comprises a resistance seam weld.

14. The method of claim 12, wherein the diaphragm is connected to the base body by TIG welding and resistance seam welding, and a welding region for the resistance seam welding is radially located at an inner side of a welding region for the TIG welding.

15. The method of claim 12, wherein the permeation resistant layer is extended over the entire inner side surface of the diaphragm.

16. The method of claim 12, wherein a coating thickness of the permeation resistant layer on the diaphragm is less than or equal to 10 µm.

17. The method of claim 12, wherein the diaphragm is formed with one or more annular folds.

18. The method of claim 12, wherein the base body is provided with a fluid channel for filling the cavity with a fluid.

19. The method of claim 12, wherein the permeation resistant layer comprises a gold-plated layer formed on the inner surface of the diaphragm.

20. The method of claim 12, wherein the permeation resistant layer does not extend to the exterior radius and the second seal.

\* \* \* \* \*